US012410046B2

(12) United States Patent
Zhou et al.

(10) Patent No.: US 12,410,046 B2
(45) Date of Patent: Sep. 9, 2025

(54) FORK LEVELING SYSTEM AND METHOD, AND TELESCOPIC BOOM FORKLIFT

(71) Applicant: Sany Marine Heavy Industry Co., Ltd., Zhuhai (CN)

(72) Inventors: Dongcai Zhou, Zhuhai (CN); Jiapeng Hong, Zhuhai (CN); Renlian Ma, Zhuhai (CN)

(73) Assignee: Sany Marine Heavy Industry Co., Ltd., Zhuhai (CN)

( * ) Notice: Subject to any disclaimer, the term of this patent is extended or adjusted under 35 U.S.C. 154(b) by 444 days.

(21) Appl. No.: 17/828,446

(22) Filed: May 31, 2022

(65) Prior Publication Data

US 2022/0289542 A1 Sep. 15, 2022

Related U.S. Application Data

(63) Continuation of application No. PCT/CN2021/087189, filed on Apr. 14, 2021.

(30) Foreign Application Priority Data

May 19, 2020 (CN) ......................... 202010427414.8

(51) Int. Cl.

*B66F 9/22* (2006.01)
*B66F 9/065* (2006.01)
*F15B 13/02* (2006.01)

(52) U.S. Cl.

CPC .............. *B66F 9/22* (2013.01); *B66F 9/0655* (2013.01); *F15B 13/025* (2013.01); *F15B 2211/205* (2013.01)

(58) Field of Classification Search

CPC ................................ B66F 9/22; F15B 13/025
See application file for complete search history.

(56) References Cited

FOREIGN PATENT DOCUMENTS

| | | | | |
|---|---|---|---|---|
| CN | 201284210 | | | 8/2009 |
| CN | 201525732 | U | | 7/2010 |
| CN | 102030293 | A | * | 4/2011 |
| CN | 202012522 | U | * | 10/2011 |
| CN | 102701119 | A | | 10/2012 |
| CN | 103550893 | A | | 2/2014 |

(Continued)

OTHER PUBLICATIONS

Machine translation of JP 2005132519 A (Year: 2005).*

(Continued)

*Primary Examiner* — Minh Truong
*Assistant Examiner* — Michelle M Mudwilder
(74) *Attorney, Agent, or Firm* — Westbridge IP LLC

(57) ABSTRACT

Disclosed are a fork leveling system and a method thereof, and a telescopic boom forklift. The fork leveling system includes an active leveling oil cylinder, a passive leveling oil cylinder and an electric control oil supplement valve, where a rodless cavity of the active leveling oil cylinder is communicated with a rodless cavity of the passive leveling oil cylinder, and a rod cavity of the active leveling oil cylinder is communicated with a rod cavity of the passive leveling oil cylinder; and an oil inlet of the electric control oil supplement valve is connected to an oil pump, and an oil outlet of the electric control oil supplement valve is connected to the rodless cavity of the active leveling oil cylinder and the rod cavity of the active leveling oil cylinder.

19 Claims, 4 Drawing Sheets

(56) References Cited

FOREIGN PATENT DOCUMENTS

| | | | | | |
|---|---|---|---|---|---|
| CN | 104019069 | A | | 9/2014 | |
| CN | 203926187 | U | | 11/2014 | |
| CN | 104179739 | A | | 12/2014 | |
| CN | 204199342 | U | * | 3/2015 | |
| CN | 204824047 | U | | 12/2015 | |
| CN | 105351265 | A | | 2/2016 | |
| CN | 105570216 | A | * | 5/2016 | |
| CN | 107191422 | A | | 9/2017 | |
| CN | 206814350 | U | | 12/2017 | |
| CN | 106678096 | B | | 5/2018 | |
| CN | 106865413 | B | * | 7/2018 | |
| CN | 108278229 | A | | 7/2018 | |
| CN | 108317115 | A | | 7/2018 | |
| CN | 207892909 | U | | 9/2018 | |
| CN | 108644164 | A | | 10/2018 | |
| CN | 109236771 | A | | 1/2019 | |
| CN | 109573896 | A | * | 4/2019 | .......... B66F 9/07504 |
| CN | 209458211 | U | * | 10/2019 | |
| CN | 110425187 | A | | 11/2019 | |
| CN | 110566526 | A | | 12/2019 | |
| CN | 110864019 | A | | 3/2020 | |
| CN | 111547653 | A | | 8/2020 | |
| CN | 112211866 | A | * | 1/2021 | ............. F15B 13/02 |
| EP | 3305994 | A2 | | 4/2018 | |
| JP | 11130385 | A | * | 5/1999 | |
| JP | H11130385 | A | | 5/1999 | |
| JP | 2005132519 | A | * | 5/2005 | |
| SU | 131450 | A1 | | 11/1960 | |
| WO | 2004088144 | A1 | | 10/2004 | |

OTHER PUBLICATIONS

Machine translation of CN 105570216 A (Year: 2016).*

Machine translation of CN 106865413 B (Year: 2018).*

First Office Action issued in counterpart Chinese Patent Application No. 202010427414.8, dated Mar. 26, 2021.

International Search Report issued in corresponding PCT Application No. PCT/CN2021/087189, dated Jul. 16, 2021.

Mu et al., Leveling Design and Error Analysis of the Fork of Telescopic Forklift, Lifting and Transporting Machinery, vol. 8, 2004, pp. 22-24, dated Aug. 31, 2004.

Written Opinion issued in corresponding PCT Application No. PCT/CN2021/087189, dated Jul. 16, 2021.

Extended European Search Report issued in counterpart European Patent Application No. 21808917.5, dated May 26, 2023.

* cited by examiner

FORK LEVELING SYSTEM AND METHOD, AND TELESCOPIC BOOM FORKLIFT

CROSS-REFERENCE TO RELATED APPLICATIONS

The present application is a continuation application of International Application No. PCT/CN2021/087189, filed on Apr. 14, 2021, which claims priority to Chinese Patent Application No. 202010427414.8, filed on May 19, 2020, the disclosures are hereby incorporated by reference in their entireties.

TECHNICAL FIELD

The present disclosure relates to the technical field of hydraulic adjustment, and in particular, to a fork leveling system and a method thereof, and a telescopic boom forklift.

BACKGROUND

A telescopic boom forklift is an organic combination of a telescopic boom structure of a truck crane and a loading and an unloading function of a traditional forklift, which can achieve a required working height and distance by continuously changing a length of its telescopic boom. Like other construction machinery, the telescopic boom forklift is also a multi-purpose machine, which may be equipped with a variety of quick-change devices to realize fork loading, loading and lifting operations.

At present, the fork leveling system of the telescopic boom forklift has an automatic leveling function and a manual leveling function. When the fork leveling system is in a state of automatic leveling, there is a problem of oil reduction in a leveling oil cylinder; in the case of oil reduction, if the fork leveling system cannot ensure being oil replenishment timely during the working process, there are the following problems: (1) the fork repeatedly automatic leveling tends to tilt down or up, and the automatic leveling fails, so that it is necessary to rely on manual adjustment to ensure the level of the fork, resulting in low efficiency; (2) empty suction of the oil cylinder cause oil leakage.

However, an existing fork leveling system has a problem of difficulty in replenishing oil in the state of automatic leveling.

SUMMARY

The present disclosure provides a fork leveling system and a method thereof, and a telescopic boom forklift, to solve the technical problem of difficulty in replenishing oil in an automatic leveling state in the prior art.

In order to achieve the above objects, the present disclosure provides the following technical solutions.

According to one aspect, the present disclosure provides a fork leveling system, including: an active leveling oil cylinder; a passive leveling oil cylinder; and an electric control oil supplement valve; a rodless cavity of the active leveling oil cylinder is communicated with a rodless cavity of the passive leveling oil cylinder, and a rod cavity of the active leveling oil cylinder is communicated with a rod cavity of the passive leveling oil cylinder; an oil inlet of the electric control oil supplement valve is connected to an oil pump, and an oil outlet of the electric control oil supplement valve is connected to the rodless cavity of the active leveling oil cylinder and the rod cavity of the active leveling oil cylinder.

In an embodiment, the fork leveling system further includes: a pressure reducing valve; the oil outlet of the electric control oil supplement valve is connected to an oil inlet of the pressure reducing valve; an oil outlet of the pressure reducing valve is connected to the rodless cavity of the active leveling oil cylinder and the rod cavity of the active leveling oil cylinder.

In an embodiment, the pressure reducing valve includes a pressure reducing overflow valve; the pressure reducing overflow valve includes an oil inlet, an oil outlet and an oil return port; the oil inlet of the pressure reducing overflow valve is connected to the oil outlet of the electric control oil supplement valve, and the oil return port of the pressure reducing overflow valve is connected to an oil tank.

In an embodiment, the pressure reducing overflow valve is configured to allow a corresponding overflow oil to flow back into the oil tank when an oil pressure at the oil outlet of the pressure reducing overflow valve is greater than a preset oil pressure.

In an embodiment, the electric control oil supplement valve includes a two-position two-way solenoid valve or a two-way electric control ball valve.

In an embodiment, the fork leveling system further includes: an electric control reversing valve; the electric control reversing valve includes an oil inlet, a first working oil port, a second working oil port and an oil return port; the oil inlet of the electric control reversing valve is connected to the oil pump, the oil return port of the electric control reversing valve is connected to the oil tank, the first working oil port of the electric control reversing valve is connected to the rodless cavity of the active leveling oil cylinder through a first pipeline, and the second working oil port of the electric control reversing valve is connected to the rod cavity of the active leveling oil cylinder through a second pipeline.

In an embodiment, the electric control reversing valve includes a three-position four-way reversing valve.

In an embodiment, the oil outlet of the pressure reducing valve is connected to the rodless cavity of the active leveling oil cylinder through the first pipeline, and the oil outlet of the pressure reducing valve is connected to the rod cavity of the active leveling oil cylinder through the second pipeline; and the fork leveling system further includes: a first one-way valve, arranged between the oil outlet of the pressure reducing valve and the first pipeline; and/or, a second one-way valve, arranged between the oil outlet of the pressure reducing valve and the second pipeline.

In an embodiment, the fork leveling system further includes: a third overflow valve; an oil inlet of the third overflow valve is connected to an oil outlet of the oil pump (9), and an oil outlet of the third overflow valve is connected to the oil tank.

In an embodiment, the third overflow valve is configured to allow a corresponding overflow oil to flow back into the oil tank when an oil pressure at the oil inlet of the third overflow valve is greater than a preset overflow oil pressure; the preset overflow oil pressure is less than or equal to a maximum working pressure of the oil pump.

In an embodiment, the fork leveling system further includes: an active leveling balance valve and a passive leveling balance valve; the active leveling balance valve is arranged at an oil inlet and oil outlet of the rodless cavity of the active leveling oil cylinder, and the passive leveling balance valve is arranged at an oil inlet and oil outlet of the rodless cavity of the passive leveling oil cylinder.

In an embodiment, the active leveling balance valve includes a pressure diaphragm part, the pressure diaphragm part of the active leveling balance valve is opened when an oil pressure value of the rod cavity of the active leveling oil cylinder is greater than a preset oil pressure value of an active rod cavity to allow oil in the rodless cavity of the active leveling oil cylinder to flow out.

In an embodiment, the preset oil pressure value of the active rod cavity is a multiple of the oil pressure value of the rod cavity of the active leveling oil cylinder.

In an embodiment, the passive leveling balance valve includes a pressure diaphragm part, the pressure diaphragm part of the passive leveling balance valve is opened when an oil pressure value of the rod cavity of the passive leveling oil cylinder is greater than a preset oil pressure value of a passive rod cavity to allow oil to flow into the rodless cavity of the passive leveling oil cylinder.

In an embodiment, the preset oil pressure value of the passive rod cavity is a multiple of the oil pressure value of the rod cavity of the passive leveling oil cylinder.

In an embodiment, the fork leveling system further includes: a first overflow valve; an oil inlet of the first overflow valve is connected to the first pipeline, and an oil outlet of the first overflow valve is connected to the oil tank; the first overflow valve is configured to allow a corresponding overflow oil to flow back into the oil tank when an oil pressure at the oil inlet of the first overflow valve is greater than a preset overflow oil pressure; the preset overflow oil pressure of the first overflow valve is less than a maximum allowable working pressure of the first pipeline.

In an embodiment, the fork leveling system further includes: a second overflow valve; an oil inlet of the second overflow valve is connected to the second pipeline, and an oil outlet of the second overflow valve is connected to the oil tank; the second overflow valve is configured to allow a corresponding overflow oil to flow back into the oil tank when an oil pressure at an oil inlet of the second overflow valve is greater than a preset overflow oil pressure; the preset overflow oil pressure of the second overflow valve is less than a maximum allowable working pressure of the second pipeline.

According to another aspect, the present disclosure provides an automatic leveling method for a fork, which is applicable to the fork leveling system as described in any of the above items, the automatic leveling method for a fork includes: opening the electric control oil supplement valve when the fork in an initial position is horizontal to enable the oil pump to supply oil to the electric control oil supplement valve.

In an embodiment, the fork leveling system includes: an electric control reversing valve; the electric control reversing valve includes an oil inlet, a first working oil port, a second working oil port and an oil return port; the oil inlet of the electric control reversing valve is connected to the oil pump, the oil return port of the electric control reversing valve is connected to the oil tank, the first working oil port of the electric control reversing valve is connected to the rodless cavity of the active leveling oil cylinder through a first pipeline, and the second working oil port of the electric control reversing valve is connected to the rod cavity of the active leveling oil cylinder through a second pipeline; the automatic leveling method for a fork further includes: closing the electric control reversing valve when the fork in the initial position is horizontal to enable the oil pump not to supply oil to the first pipeline and the second pipeline.

In an embodiment, the automatic leveling method for a fork further includes: enabling the passive leveling oil cylinder to extend to enable oil of the rod cavity of the passive leveling oil cylinder to enter the rod cavity of the active leveling oil cylinder, so that the active leveling oil cylinder is driven to retract, and oil of the rodless cavity of the active leveling oil cylinder enters the rodless cavity of the passive leveling oil cylinder.

In an embodiment, the automatic leveling method for a fork further includes: enabling the passive leveling cylinder to retract to enable oil of the rodless cavity of the passive leveling oil cylinder to enter the rodless cavity of the active leveling oil cylinder, so that the active leveling oil cylinder is driven to extend, and oil of the rod cavity of the active leveling oil cylinder enters the rod cavity of the passive leveling oil cylinder.

According to another aspect, the present disclosure provides a telescopic boom forklift, including: a fork; a boom arm assembly; a chassis system; and the fork leveling system as described in any of the above items; the passive leveling oil cylinder of the fork leveling system is connected between the boom arm assembly and the chassis system; the active leveling oil cylinder of the fork leveling system is connected between the boom arm assembly and the fork.

According to another aspect, the present disclosure provides an automatic leveling method for a fork, which is applicable to the telescopic boom forklift as described above, the automatic leveling method for a fork includes: opening the electric control oil supplement valve when the fork in an initial position is horizontal to enable the oil pump to supply oil to the electric control oil supplement valve.

In an embodiment, the telescopic boom forklift includes: an electric control reversing valve; the electric control reversing valve includes an oil inlet, a first working oil port, a second working oil port and an oil return port; the oil inlet of the electric control reversing valve is connected to the oil pump, the oil return port of the electric control reversing valve is connected to the oil tank, the first working oil port of the electric control reversing valve is connected to the rodless cavity of the active leveling oil cylinder through a first pipeline, and the second working oil port of the electric control reversing valve is connected to the rod cavity of the active leveling oil cylinder through a second pipeline; the automatic leveling method for a fork further includes: closing the electric control reversing valve when the fork in the initial position is horizontal to enable the oil pump not supply oil to the first pipeline and the second pipeline.

In an embodiment, the automatic leveling method for a fork further includes: when the boom arm assembly luffs upward, enabling the passive leveling oil cylinder to extend to enable oil of the rod cavity of the passive leveling oil cylinder to enter the rod cavity of the active leveling oil cylinder, so that the active leveling cylinder is driven to retract, and oil of the rodless cavity of the active leveling oil cylinder enters the rodless cavity of the passive leveling oil cylinder, and the fork is rotated downward to keep horizontal.

In an embodiment, the automatic leveling method for a fork further includes: when the boom arm assembly luffs downward, enabling the passive leveling oil cylinder to retract to enable oil of the rodless cavity of the passive leveling oil cylinder to enter the rodless cavity of the active leveling oil cylinder, so that the active leveling cylinder is driven to extend, and oil of the rod cavity of the active leveling oil cylinder enters the rod cavity of the passive leveling oil cylinder, and the fork is rotated upward to keep horizontal.

The beneficial effect of the present disclosure is described as follows.

According to the fork leveling system and a method thereof, and the telescopic boom forklift provided by the present disclosure, by constituting a fork leveling system with automatic oil replenishment function by connecting an electronic control oil supplement valve to an original fork leveling system, the automatic oil replenishment function is effectively obtained when the fork leveling system is in the state of automatic leveling, which can fully replenish oil without causing the malfunction of other valves, and may effectively avoid a failure of the fork leveling system, empty suction and leakage of the oil cylinder, and others problems caused by oil shortage of the active leveling oil cylinder.

In order to make the above-mentioned objects, features and advantages of the present application more obvious and easier to understand, preferred embodiments are exemplified below, and are described in detail as follows in conjunction with the accompanying drawings.

BRIEF DESCRIPTION OF DRAWINGS

In order to illustrate the technical solutions of the embodiments of the present disclosure more clearly, the accompanying drawings required in the embodiments will be briefly introduced below. It should be understood that the following accompanying drawings only show some embodiments of the present disclosure, so they should not be regarded as a limitation of the scope, and for those of ordinary skill in the art, other related drawings may also be obtained according to these accompanying drawings without making any creative effort.

DETAILED DESCRIPTION OF THE EMBODIMENTS

Figure 1:
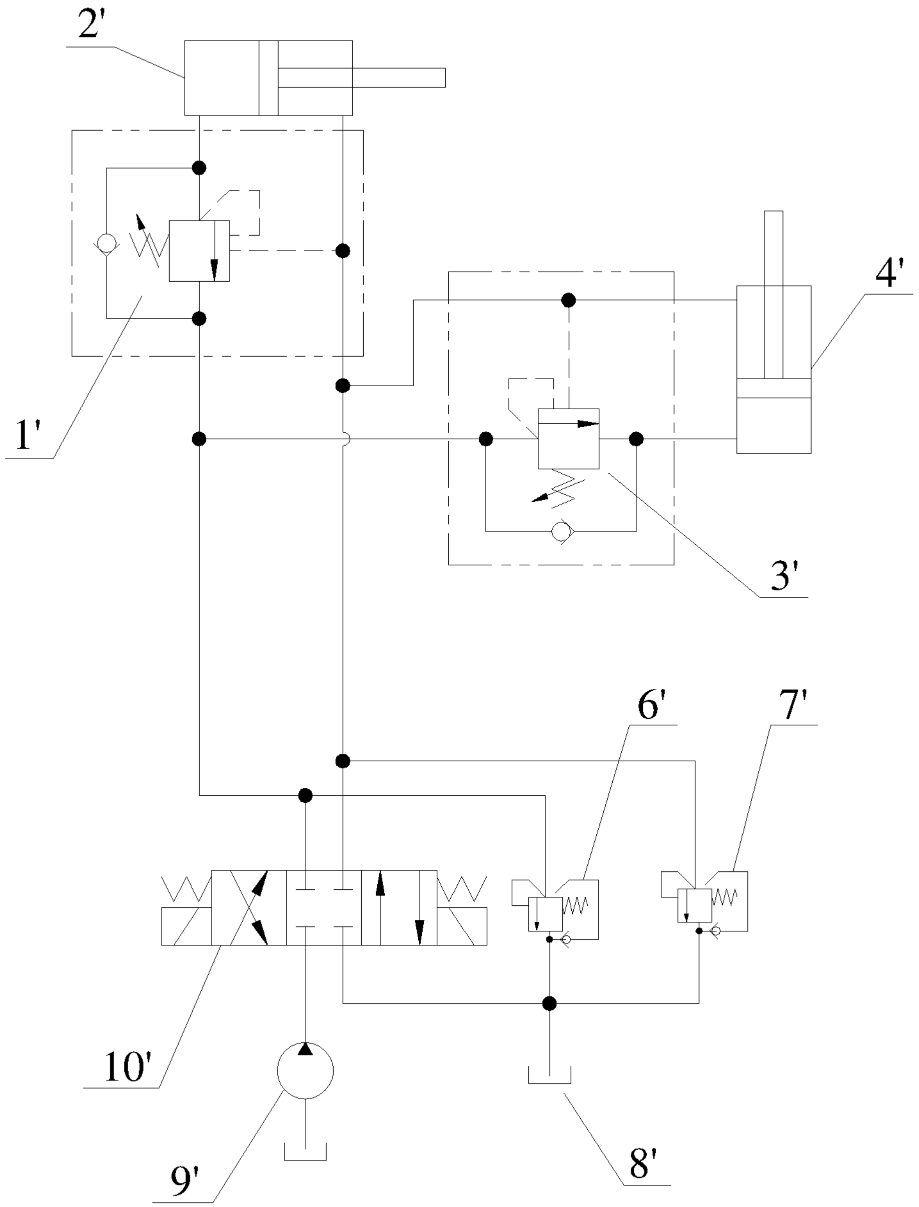
FIG. 1 (Prior Art)
FIG. 1 is a schematic diagram of a structure principle of an existing fork leveling system.

In order to make the purposes, technical solutions and advantages of the embodiments of the present disclosure clearer, the technical solutions in the embodiments of the present disclosure will be clearly and completely described below with reference to the accompanying drawings in the embodiments of the present disclosure. Obviously, the described embodiments are some embodiments of the present disclosure, but not all embodiments. The components of the embodiments of the present disclosure generally described and illustrated in the accompanying drawings herein may be arranged and designed in a variety of different configurations.

Thus, the following detailed description of the embodiments of the present disclosure provided in the accompanying drawings is not intended to limit the scope of the present disclosure as claimed, but is merely representative of selected embodiments of the present disclosure. Based on the embodiments of the present disclosure, all other embodiments obtained by those of ordinary skill in the art without making creative efforts shall fall within the protection scope of the present disclosure.

It should be noted that similar symbols and letters indicate similar items in the following drawings, so once an item is defined in one drawing, it does not need to be further defined and explained in subsequent drawings.

In the description of the present disclosure, it should be noted that an orientation or positional relationship indicated by the terms "center", "upper", "lower", "left", "right", "vertical", "horizontal", "inner", and "outer", etc. is based on the orientation or positional relationship shown in the accompanying drawings, or the orientation or positional relationship that the product of the disclosure is usually placed in use, only for the convenience of describing the present disclosure and simplifying the description, rather than indicating or implying that the device or element indicated must have a particular orientation, and be constructed and operated in a particular orientation, and therefore should not be construed as a limitation of the present disclosure. Furthermore, the terms "first", "second", and "third", etc. are merely used to differentiate the description and should not be construed as indicating or implying relative importance.

Furthermore, the terms "horizontal", "vertical", and "overhanging" etc. do not imply that a component is required to be absolutely horizontal or overhang, but rather may be slightly inclined. For example, "horizontal" merely means that the direction is more horizontal than "vertical", it does not mean that the structure must be completely horizontal, but may be slightly inclined.

In the description of the present disclosure, it should also be noted that, unless otherwise expressly specified and limited, the terms "arrangement", "installation", "joint" and "connection" should be understood in a broad sense, for example, it may be a fixed connection, it may also be a detachable connection or an integral connection; it may be a mechanical connection or an electrical connection; it may be a direct connection or an indirect connection through an intermediate medium, or an internal communication between two components. For those of ordinary skill in the art, the specific meanings of the above terms in the present disclosure may be understood in specific situations.

Some embodiments of the present disclosure will be described in detail below with reference to the accompanying drawings. The embodiments described below and features in the embodiments may be combined with each other without conflict.

Figure 2:
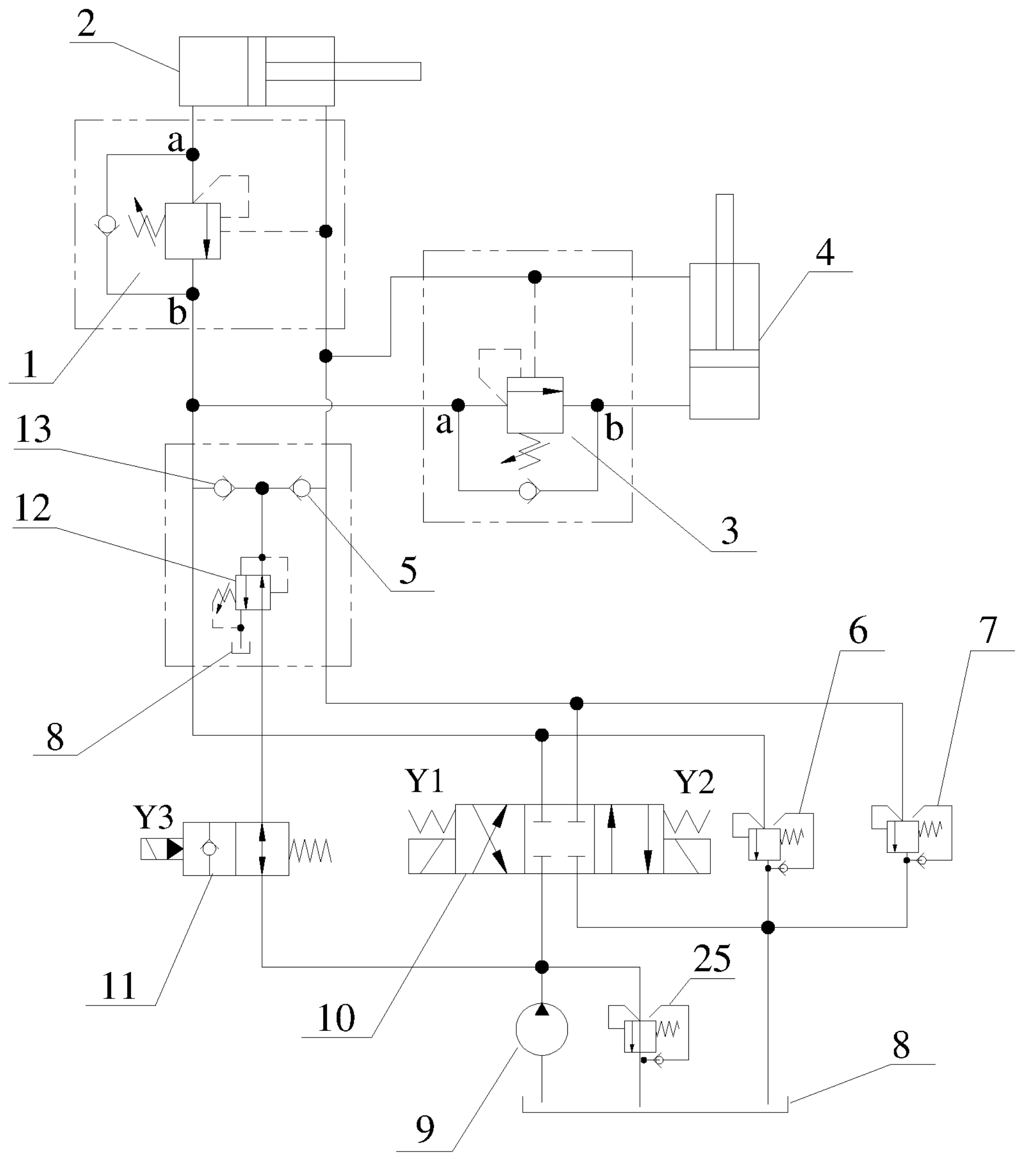
FIG. 2 is a schematic diagram of a structure principle of a fork leveling system provided by an embodiment of the present disclosure.
Figure 3:
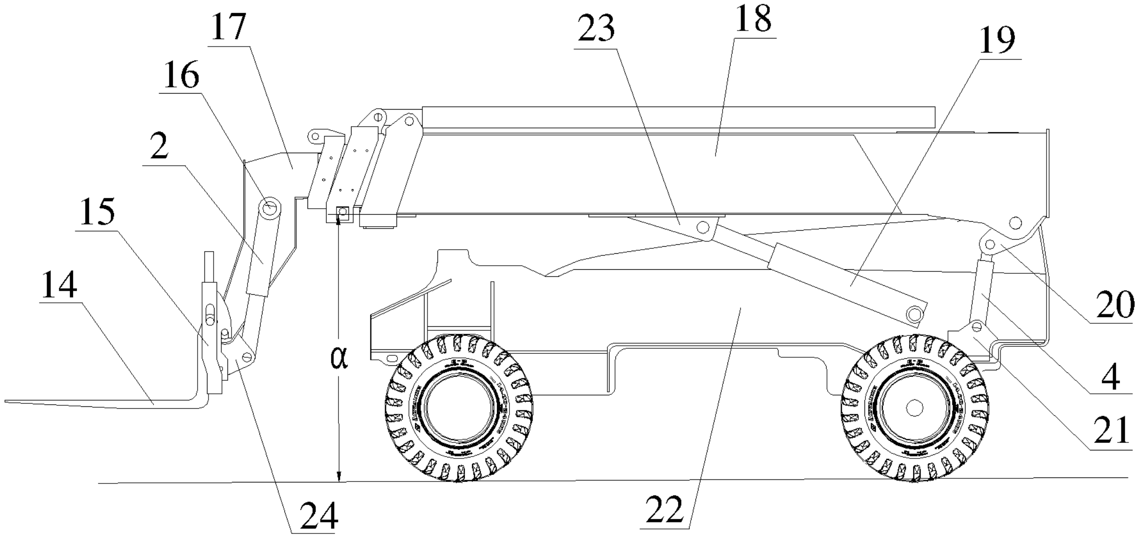
FIG. 3 is a schematic structural diagram of a telescopic forklift provided by an embodiment of the present disclosure, where the telescopic forklift is in a first state.
Figure 4:
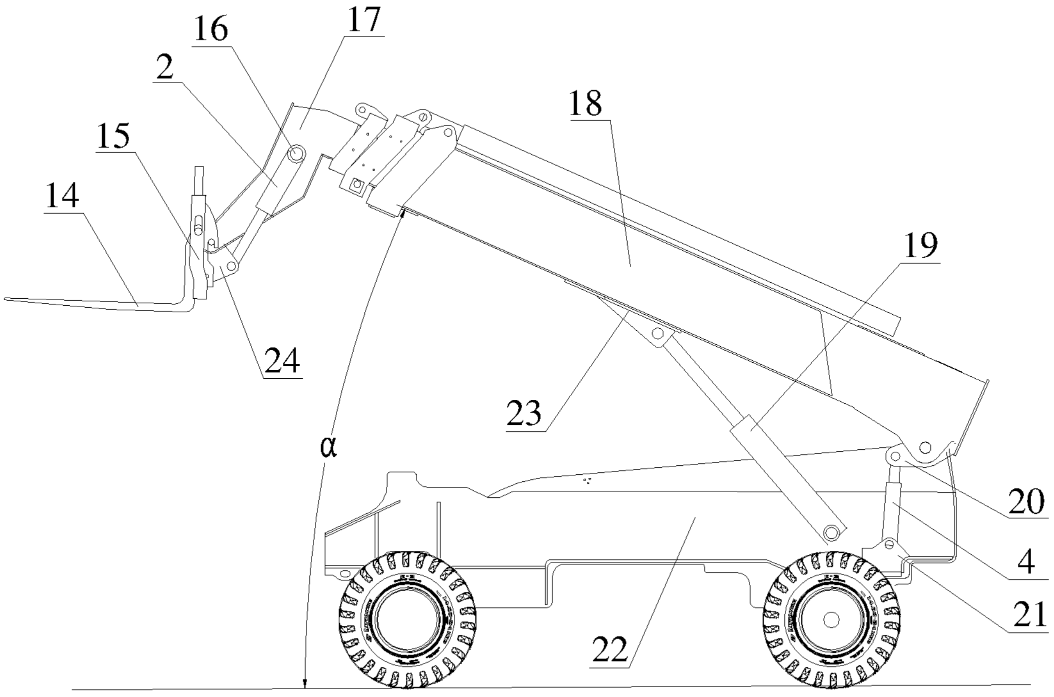
FIG. 4 is a schematic structural diagram of a telescopic forklift provided by an embodiment of the present disclosure, where the telescopic forklift is in a second state.

This embodiment provides a fork leveling system and a method thereof, and a telescopic boom forklift, please refer to FIG. 2-FIG. 4. FIG. 2 is a schematic diagram of a structure principle of a fork leveling system provided in this embodiment; FIG. 3 and FIG. 4 are respectively schematic structure diagram of two states of a telescopic forklift provided in this embodiment, and an angle e between a boom of a boom arm assembly and the ground is 0 degrees as shown in FIG. 3, and a fork is in a horizontal state; an angle e between a boom of a boom arm assembly and the ground is 24 degrees as shown in FIG. 4, and a fork is in a horizontal state.

A fork leveling system provided in this embodiment is used for a telescopic boom forklift and similar mechanical equipment thereof.

As shown in FIG. 2, the fork leveling system includes an active leveling oil cylinder 2, a passive leveling oil cylinder 4, and an electric control oil supplement valve 11.

A rodless cavity of the active leveling oil cylinder 2 is communicated with a rodless cavity of the passive leveling oil cylinder 4, and a rod cavity of the active leveling oil cylinder 2 is communicated with a rod cavity of the passive leveling oil cylinder 4; optionally, the rodless cavity of the active leveling oil cylinder 2 is communicated with the rodless cavity of the passive leveling oil cylinder 4 through a pipeline, and the rod cavity of the active leveling oil cylinder 2 is communicated with the rod cavity of the passive leveling oil cylinder 4 through a pipeline.

An oil inlet of the electric control oil supplement valve 11 is connected to an oil pump 9, and an oil outlet of the electric control oil supplement valve 11 is connected to the rodless cavity of the active leveling oil cylinder 2 and the rod cavity of the active leveling oil cylinder 2.

The fork leveling system of this embodiment constitutes a fork leveling system with automatic oil replenishment function by connecting an electronic control oil supplement valve 11 to an original fork leveling system, and the automatic oil replenishment function is effectively obtained when the fork leveling system is in the state of automatic leveling, which may fully replenish oil without causing the malfunction of other valves, and may effectively avoid a failure of the fork leveling system, empty suction and leakage of the oil cylinder, and other problems caused by oil shortage of the active leveling oil cylinder 2.

In an embodiment, as shown in FIG. 2, the fork leveling system above-mentioned further includes: an electric control reversing valve 10. The electric control reversing valve 10 is provided with an oil inlet, a first working oil port, a second working oil port and an oil return port; the oil inlet of the electric control reversing valve 10 is connected to the oil pump 9, the oil return port of the electric control reversing valve 10 is connected to the oil tank 8, the first working oil port of the electric control reversing valve 10 is connected to the rodless cavity of the active leveling oil cylinder 2 through a first pipeline, and the second working oil port of the electric control reversing valve 10 is connected to the rod cavity of the active leveling oil cylinder 2 through a second pipeline; the oil pump 9 can supply oil to the rodless cavity or the rod cavity of the active leveling oil cylinder 2 by controlling the electric control reversing valve 10.

In an embodiment, as shown in FIG. 2, the fork leveling system above-mentioned further includes: a pressure reducing valve 12. The oil inlet of the electric control oil supplement valve 11 is connected to the oil pump 9, the oil outlet of the electric control oil supplement valve 11 is connected to an oil inlet of the pressure reducing valve 12; an oil outlet of the pressure reducing valve 12 is connected to the first pipeline and the second pipeline, that is, the oil outlet of the pressure reducing valve 12 is connected to the rodless cavity of the active leveling oil cylinder 2 through the first pipeline, and the oil outlet of the pressure reducing valve 12 is connected to the rod cavity of the active leveling oil cylinder 2 through the second pipeline. The fork leveling system of this embodiment, The oil pump 9 can supply oil to the rodless cavity of the active leveling oil cylinder 2 through the first pipeline, and supply oil to the rod cavity of the active leveling oil cylinder 2 through the second pipeline by controlling the electric control oil supplement valve 11 to be in an open state.

Optionally, the electric control reversing valve 10 is a three-position four-way reversing valve; optionally, the electric control reversing valve 10 is a three-position four-way solenoid valve or other valves that can realize the functions described in this embodiment.

Optionally, the electric control oil supplement valve 11 is an electric control valve, such as a two-position two-way solenoid valve or two-way electric control ball valve.

Optionally, the oil outlet of the pressure reducing valve 12 can output oil at a preset oil pressure stably. For example, the oil outlet of the pressure reducing valve 12 can stably output oil at an oil pressure of 7 bar. The preset oil pressure output from the oil outlet of the pressure reducing valve 12 may be determined according to factors such as a boom, a level state of the fork, and a maximum pressure value required to maintaining a level of the fork.

The fork leveling system of this embodiment constitute a fork leveling system with automatic oil replenishment function by connecting the electronic control oil supplement valve 11 and the pressure reducing valve 12 to an original fork leveling system, and the automatic oil replenishment function is effectively obtained when the fork leveling system is in the state of automatic leveling, which may fully replenish oil without causing the malfunction of other valves, and may effectively avoid a failure of the fork leveling system, empty suction and leakage of the oil cylinder, and other problems caused by oil shortage of the active leveling oil cylinder 2.

FIG. 1 is a schematic diagram of a structure principle of an existing fork leveling system. As shown in FIG. 1, a fork leveling system of an existing telescopic boom forklift realizes an automatic leveling function by a communication mechanism including two oil cylinders, and it can work in two modes: automatic leveling mode and manual leveling mode.

When the existing fork leveling system is in the automatic leveling mode, a three-position four-way solenoid valve 10' is de-energized, and a spool is in a neutral position.

When a boom of the telescopic boom forklift luffs upward, it drives a passive leveling oil cylinder 4' to extend, and oil in a rod cavity of the passive leveling cylinder 4' enters into a rod cavity of a active leveling oil cylinder 2' through a pipeline, and so that the active leveling oil cylinder 2' is driven to retract, and oil in a rodless cavity of the active leveling oil cylinder 2' enters into a rodless cavity of the passive leveling oil cylinder 4' through an active leveling balance valve 1' and a passive leveling balance valve 3' in turn. At this moment, the fork is rotated downward to keep horizontal.

When the boom of the telescopic boom forklift luffs downward, it drives the passive leveling oil cylinder 4' to retract, and the oil in the rodless cavity of the passive leveling oil cylinder 4' enters into the rodless cavity of the active leveling oil cylinder 2' through the passive leveling balance valve 3' and the active leveling balance valve 1' in turn, so that the active leveling oil cylinder 2' is driven to extend, and the oil of the rod cavity of the active leveling oil cylinder 2' enters into the rod cavity of the passive leveling oil cylinder 4' through a pipeline. At this moment, the fork is rotated upward to keep horizontal.

When the existing fork leveling system is in the manual leveling mode, the driver may adjust the three-position four-way solenoid valve 10' by energizing it to realize an angle adjustment of the fork.

When a spool of the three-position four-way solenoid valve 10' is in a left position, the rodless cavity of the active leveling oil cylinder 2' is communicated with the oil pump 9' to obtain oil, and the active leveling oil cylinder 2' extends, and the fork rotates upward.

When the spool of the three-position four-way solenoid valve 10' is in a right position, the rod cavity of the active leveling oil cylinder 2' is communicated with the oil pump 9' to obtain oil, and the active leveling oil cylinder 2' retracts, and the fork rotates downward.

The existing fork leveling system realizes the automatic leveling by a communication mechanism including two oil cylinders, However, the existing fork leveling system has the problem that the oil in the leveling oil cylinder decrease for the following three reasons:

(1) The three-position four-way solenoid valve 10' is a slide valve, it leaks oil during work, which will cause the oil inside the oil cylinders of the active leveling oil cylinder 2' and the passive leveling oil cylinder 4' to decrease.

(2) Under the working conditions of the boom luffing and active leveling of the fork of the telescopic boom forklift, shaking of the boom and vibration of a whole vehicle can cause the vibration of the fork, the oil inside the active leveling oil cylinder 2' will overflow into the oil tank 8' through a first overflow valve 6' or a second overflow valve 7', causing the oil in the active leveling oil cylinder 2' to decrease.

(3) Under some operating conditions, the active leveling oil cylinder 2' reaches a limit position, the rod of the passive leveling oil cylinder 4' keeps moving, and the excess oil overflows into the oil tank 8' through the first overflow valve 6' or the second overflow valve 7', causing the oil inside the active leveling oil cylinder 2' and the passive leveling oil cylinder 4' to decrease.

In the case that oil decrease, if the oil cannot be supplied in time during the working process of the fork leveling system, there are the following problems: (1) the fork repeatedly automatic leveling tends to tilt down or up, and the automatic leveling fails, it is necessary to rely on manual adjustment to ensure the level of the fork, which is inefficient; (2) empty suction of the oil cylinder cause oil leakage. However, the problem of the existing fork leveling system is that oil replenishment is difficult in the state of automatic leveling, due to the factors such as an arrangement and length of the oil pipeline, and boom height, and so on.

In order to solve the problems existing in the existing fork leveling system in the state of automatic leveling that how to ensure efficient and reliable supplement oil to the leveling oil circuit and avoid fork tilt and oil cylinder leakage caused by the reduction of the oil in the leveling oil cylinder. A fork leveling system is provided in this embodiment, which has the function of automatic oil replenishment on the condition that the effectiveness of manual leveling operation is ensured, the fork leveling system includes a electronic control oil supplement valve 11 and a pressure reducing valve 12, etc. the fork leveling system can effectively realize the automatic oil replenishment function when the fork leveling system is in the state of automatic leveling. The oil entering the pressure reducing valve 12 comes from an oil outlet of the oil pump 9, which may avoid the problem of insufficient oil replenishment caused by problems such as pipeline and height.

As shown in FIG. 2, in an optional scheme of this embodiment, a first one-way valve 13 is arranged between the oil outlet of the pressure reducing valve 12 and the first pipeline; and/or, a second one-way valve 5 is arranged between the oil outlet of the pressure reducing valve 12 and the second pipeline. That is, a first one-way valve 13 is arranged between the oil outlet of the pressure reducing valve 12 and the first pipeline; or, a second one-way valve 5 is arranged between the oil outlet of the pressure reducing valve 12 and the second pipeline; Alternatively, a first one-way valve 13 is arranged between the oil outlet of the pressure reducing valve 12 and the first pipeline, and a second one-way valve 5 is arranged between the oil outlet of the pressure reducing valve 12 and the second pipeline. In the state of automatic leveling of the fork leveling system, the oil pump 9 supply oil to the first pipeline and the second pipeline in one direction respectively through the first one-way valve 13 and the second one-way valve 5, that is, the oil pump 9 supply oil to the rodless cavity and the rod cavity of the active leveling oil cylinder 2 in one direction, to realize the automatic oil replenishment function; which can prevent vibration of the fork 14 caused by the shaking of the boom and the vibration of the whole vehicle, and prevent the oil in the active leveling oil cylinder 2 from flowing back through the pressure reducing valve 12, also prevent the oil from flowing back through the pressure reducing valve 12 caused by other working conditions.

In an optional scheme of this embodiment, the pressure reducing valve 12 is a pressure reducing overflow valve; by using a pressure reducing overflow valve, it can be ensured that the oil outlet of the pressure reducing overflow valve can stably output oil at a preset oil pressure.

As shown in FIG. 2, optionally, the pressure reducing overflow valve is provided with an oil inlet, an oil outlet and an oil return port; the oil inlet of the pressure reducing overflow valve is connected to the oil outlet of the electric control oil supplement valve 11, and the oil outlet of the pressure reducing overflow valve is connected to the first pipeline and the second pipeline; and the oil return port of the pressure reducing overflow valve is connected to an oil tank 8.

The pressure reducing overflow valve is configured to allow a corresponding overflow oil to flow back into the oil tank 8 when the oil pressure at the oil outlet of the pressure reducing overflow valve is greater than the preset oil pressure, so as to ensure the normal operation of the pressure reducing overflow valve, and to improve the working life of the pressure reducing valve 12.

As shown in FIG. 2, in an optional scheme of this embodiment, the fork leveling system includes a third overflow valve 25.

An oil inlet of the third overflow valve 25 is connected to the oil outlet of the oil pump 9, and an oil outlet of the third overflow valve 25 is connected to the oil tank 8.

The third overflow valve 25 is configured to allow a corresponding overflow oil to flow back into the oil tank 8 when an oil pressure at the oil inlet of the third overflow valve 25 is greater than a preset overflow oil pressure; the preset overflow oil pressure of the third overflow valve 25 is less than a maximum working pressure of the oil pump 9. The third overflow valve 25 is used to prevent the oil pump 9 from being burned out when an output pipeline of the oil pump 9 is blocked under special working conditions. The output pipeline of the oil pump 9 can be blocked in the following situations, such as, the electric control reversing valve 10 is closed, and the oil pump 9 is in a working state. In this embodiment, the preset overflow oil pressure of the third overflow valve 25 may also be equal to the maximum working pressure of the oil pump 9 in extreme cases, but it is not recommended that the preset overflow oil pressure of the third overflow valve 25 be greater than the maximum working pressure of the oil pump 9 for safety performance of the fork leveling system.

As shown in FIG. 2, in an optional scheme of this embodiment, the fork leveling system includes an active leveling balance valve 1 and a passive leveling balance valve 3; optionally, the passive leveling balance valve 3 and the active leveling balance valve 1 both include a one-way valve part and a pressure diaphragm part.

The active leveling balance valve 1 is arranged at an oil inlet and oil outlet of the rodless cavity of the active leveling oil cylinder 2, and the passive leveling balance valve 3 is arranged at an oil inlet and oil outlet of the rodless cavity of the passive leveling oil cylinder 4.

The active leveling balance valve 1 is configured to allow the pressure diaphragm part of the active leveling balance valve 1 to be opened when an oil pressure value of the rod cavity of the active leveling oil cylinder 2 is greater than a preset oil pressure value of an active rod cavity, to enable oil in the rodless cavity of the active leveling oil cylinder 2 to flow out. As shown in FIG. 2, when the pressure diaphragm part of the active leveling balance valve 1 is opened, the oil flows from a to b of the active leveling balance valve 1. Optionally, the preset oil pressure value of the active rod cavity of the active leveling balance valve 1 is a multiple of the oil pressure value of the rod cavity of the active leveling oil cylinder 2. For example, the preset oil pressure value of the active rod cavity of the active leveling balance valve 1 is 4.5 times of the oil pressure value of the rod cavity of the active leveling oil cylinder 2.

The passive leveling balance valve 3 is configured to allow the pressure diaphragm part of the passive leveling balance valve 3 to be opened when an oil pressure value of the rod cavity of the passive leveling oil cylinder 4 is greater than a preset oil pressure value of an passive rod cavity to enable oil flow into the rodless cavity of the passive leveling oil cylinder 4. As shown in FIG. 2, when the pressure diaphragm part of the passive leveling balance valve 3 is opened, the oil flows from a to b of the passive leveling balance valve 3. Optionally, the preset oil pressure value of the passive rod cavity of the passive leveling balance valve 3 is a multiple of the oil pressure value of the rod cavity of the passive leveling oil cylinder 4. For example, the preset oil pressure value of the passive rod cavity of the passive leveling balance valve 3 is 4.5 times of the oil pressure value of the rod cavity of the passive leveling oil cylinder 4.

In the fork leveling system, the oil inlet and oil outlet of the rodless cavity of the active leveling oil cylinder 2, the active leveling balance valve 1, the passive leveling balance valve 3 and the passive leveling oil cylinder 4 are connected in turn.

Optionally, the first working oil port of the electric control reversing valve 10 is connected to the oil inlet and oil outlet of the rodless cavity of the active leveling oil cylinder 2 through the first pipeline, and the second working oil port of the electric control reversing valve 10 is connected to the oil inlet and oil outlet of the rod cavity of the active leveling oil cylinder 2 through the second pipeline.

Referring to FIG. 2, in an optional scheme of this embodiment, the fork leveling system includes a first overflow valve 6 and a second overflow valve 7.

An oil inlet of the first overflow valve 6 is connected to the first pipeline, and an oil outlet of the first overflow valve 6 is connected to the oil tank 8; the first overflow valve 6 is configured to allow a corresponding overflow oil to flow back into the oil tank 8 when an oil pressure at the oil inlet of the first overflow valve 6 is greater than a preset overflow oil pressure; the preset overflow oil pressure of the first overflow valve 6 is less than a maximum allowable working pressure of the first pipeline. The safety performance of the fork leveling system is improved by using the first overflow valve 6. In this embodiment, the preset overflow oil pressure of the first overflow valve 6 may also be equal to the maximum allowable working pressure of the first pipeline in extreme cases, but it is not recommended that the preset overflow oil pressure of the first relief valve 6 is greater than the maximum allowable working pressure of the first pipeline for safety performance of the fork leveling system.

An oil inlet of the second overflow valve 7 is connected to the second pipeline, and an oil outlet of the second overflow valve 7 is connected to the oil tank 8; the second overflow valve 7 is configured to allow a corresponding overflow oil to flow back into the oil tank 8 when an oil pressure at the oil inlet of the second overflow valve 7 is greater than a preset overflow oil pressure; the preset overflow oil pressure of the second overflow valve 7 is less than a maximum allowable working pressure of the second pipeline. The safety performance of the fork leveling system is improved by using the second relief valve 7. In this embodiment, the preset overflow oil pressure of the second overflow valve 7 may also be equal to the maximum allowable working pressure of the second pipeline in extreme cases, but it is not recommended that the preset overflow oil pressure of the second relief valve 7 is greater than the maximum allowable working pressure of the second pipeline for safety performance of the fork leveling system.

In this embodiment, an automatic leveling method for a fork is provided, which is applicable to the fork leveling system mentioned above; that is, a fork leveling system is in a state of automatic leveling, or to say, the fork leveling system is in a passive leveling state, the automatic leveling method for a fork includes:

The fork 14 in the initial position is horizontal; the electric control oil supplement valve 11 and the electric control reversing valve 10 are both de-energized, so the electric control oil supplement valve 11 is opened to enable the oil pump 9 to supply oil to the pressure reducing valve 12 through the electric control oil supplement valve 11, and the electric control reversing valve 10 is closed to enable the oil pump 9 not supply oil to the first pipeline and the second pipeline through the electric control reversing valve 10, that is, the oil pump 9 cannot supply oil to the rodless cavity and the rod cavity of the active leveling oil cylinder 2 through the electric control reversing valve 10. Optionally, an electromagnet Y3 of the electric control oil supplement valve 11 is de-energized when the electric control oil supplement valve 11 is de-energized, the electric control oil supplement valve 11 is opened to enable the oil pump 9 supply oil to the pressure reducing valve 12, as shown in FIG. 2, that is, the electric control oil supplement valve 11 is closed in energized state and opened in de-energized state. Optionally, electromagnets Y1 and Y2 of the electric control reversing valve 10 are de-energized when the electric control reversing valve 10 is de-energized, the electric control reversing valve 10 is closed to enable the oil pump 9 not supply oil to the first pipeline and the second pipeline, as shown in FIG. 2, that is, the electric control reversing valve 10 is opened in energized state and closed in de-energized state. The automatic leveling method for a fork described in this embodiment, the oil pump 9 provides oil at a stable oil pressure to the rodless cavity and the rod cavity of the active leveling oil cylinder 2 to replenish oil through the pressure reducing valve 12, that is, the oil pump 9 provides oil at a stable oil pressure for the fork leveling system to replenish oil; when the electric control oil supplement valve 11 and the electric control reversing valve 10 are de-energized at the same time, the oil pump 9 supplies oil to the pressure reducing valve 12, so that the electric power consumed by the electric control oil supplement valve 11 and the electric control reversing valve 10 may be reduced or avoided when the fork leveling system is in the state of automatic leveling, so as to save electric power to a certain extent.

When the passive leveling oil cylinder 4 extend, the oil in the rod cavity of the passive leveling oil cylinder 4 enters into the rod cavity of the active leveling oil cylinder 2 through pipelines, so that the active leveling oil cylinder 2 is driven to retract, and the oil of the rodless cavity of the active leveling oil cylinder 2 enters into the rodless cavity of the passive leveling oil cylinder 4. At this moment, the fork 14 is rotated downward to keep horizontal; Optionally, the oil of the rodless cavity of the active leveling oil cylinder 2 enters into the rodless cavity of the passive leveling oil cylinder 4 through the pressure diaphragm part of the active leveling balance valve 1 and the pressure diaphragm part of the passive leveling balance valve 3 in turn.

When the passive leveling oil cylinder 4 retract, the oil in the rodless cavity of the passive leveling oil cylinder 4 enters into the rodless cavity of the active leveling oil cylinder 2, so that the active leveling oil cylinder 2 is driven to extend, and the oil of the rod cavity of the active leveling oil cylinder 2 enters into the rod cavity of the passive leveling oil cylinder 4 through oil pipelines. At this moment, the fork 14 is rotated upward to keep horizontal; optionally, the oil of the rodless cavity of the passive leveling oil cylinder 4 enters into the rodless cavity of the active leveling oil cylinder 2 through the one-way valve part of the passive leveling balance valve 3 and the one-way valve part of the active leveling balance valve 1 in turn.

The automatic leveling method for a fork described in this embodiment is applicable to the above-mentioned fork leveling system, the automatic oil replenishment function is effectively obtained when the fork leveling system is in the state of automatic leveling, which may fully replenish oil without causing the malfunction of other valves, and may effectively avoid a failure of the fork leveling system, empty suction and leakage of the oil cylinder, and other problems caused by oil shortage of the active leveling oil cylinder 2. The technical features of the fork leveling system disclosed above are also applicable to the automatic leveling method for a fork, and the technical features of the fork leveling system disclosed above will not be repeated again. The automatic leveling method for a fork in this embodiment has the advantages of the fork leveling system described above, and the advantages of the fork leveling system disclosed above will not be repeated here.

As shown in FIG. 2, the fork leveling system described in this embodiment is in the state of manual leveling, that is, the fork leveling system is in the state of active leveling, the leveling method includes: the electric control oil supplement valve 11 and the electric control reversing valve 10 are both energized to close the electric control oil supplement valve 11 to enable the oil pump 9 not supply oil to the pressure reducing valve 12 through the electric control oil supplement valve 11, and to open the electric control reversing valve 10 to enable the oil pump 9 supply oil to the first pipeline and the second pipeline through the electric control reversing valve 10, that is, the oil pump 9 can supply oil to the rodless cavity or the rod cavity of the active leveling oil cylinder 2 through the electric control reversing valve 10. Optionally, the electromagnet Y3 of the electric control oil supplement valve 11 is energized when the electric control oil supplement valve 11 is energized, to close the electric control oil supplement valve 11, so that the oil pump 9 cannot supply oil to the pressure reducing valve 12 through the electric control oil supplement valve 11, as shown in FIG. 2.

When the oil inlet of the electric control reversing valve 10 is in communication with the first working oil port, the oil pump 9 is communicated with the rodless cavity of the active leveling oil cylinder 2 through the first pipeline, the active leveling oil cylinder 2 is driven to extend, and the fork is rotated upward. Optionally, when the electromagnet Y1 of the electric control reversing valve 10 is energized, the spool is in the left position, the rodless cavity of the active leveling oil cylinder 2 is in communication with the oil pump 9, and the active leveling oil cylinder 2 is driven to extend, and the fork is rotated upward.

When the oil inlet of the electric control reversing valve 10 is in communication with the second working oil port, the oil pump 9 is communicated with the rod cavity of the active leveling oil cylinder 2 through the second pipeline, the active leveling oil cylinder 2 is driven to retract, and the fork is rotated downward. Optionally, when the electromagnet Y2 of the electric control reversing valve 10 is energized, the spool is in the right position, the rod cavity of the active leveling oil cylinder 2 is in communication with the oil pump 9, and the active leveling oil cylinder 2 is driven to retract, and the fork is rotated downward.

Referring to FIG. 3 and FIG. 4, the embodiment provides a telescopic boom forklift, including a fork 14, a boom arm assembly 18, a chassis system 22 and the fork leveling system. Optionally, the boom arm assembly 18 is connected to the chassis system 22 through a luffing oil cylinder 19, to realize a lifting and lowering of the boom arm assembly 18. Optionally, the boom arm assembly 18 is provided with a luffing support lug 23 connected with the luffing oil cylinder 19.

The passive leveling oil cylinder 4 of the fork leveling system is connected between the boom arm assembly 18 and the chassis system 22; optionally, the rod of the passive leveling oil cylinder 4 is connected to a support lug of passive leveling oil cylinder 20 on the boom arm assembly 18. Optionally, the cylinder of the passive leveling oil cylinder 4 is rotatably connected to the chassis system 22 through a passive leveling oil cylinder fixing pin 21.

The active leveling oil cylinder 2 of the fork leveling system is connected between the boom arm assembly 18 and the fork 14. Optionally, the fourth segment arm 17 of the boom assembly 18 is rotatably connected with the active leveling oil cylinder 2 through an active leveling oil cylinder fixing pin 16. Optionally, a fork carriage 15 is fixedly connected to the fork 14, a quick-change connector 24 is fixedly connected to the fork carriage 15, and the fork 14 is connected to the active leveling oil cylinder 2 through the quick-change connector 24.

The telescopic boom forklift described in this embodiment includes the fork leveling system above-mentioned, the automatic oil replenishment function is effectively obtained when the fork leveling system is in the state of automatic leveling, which may fully replenish oil without causing the malfunction of other valves, and may effectively avoid a failure of the fork leveling system, empty suction and leakage of the oil cylinder, and other problems caused by oil shortage of the active leveling oil cylinder 2. The technical features of the fork leveling system disclosed above are also applicable to the telescopic boom forklift, and the technical features of the fork leveling system disclosed above will not be repeated again. The telescopic boom forklift described in this embodiment has the advantages of the fork leveling system described above, and the advantages of the fork leveling system disclosed above will not be repeated here.

In this embodiment an automatic leveling method for a fork is provided, which is applicable to a telescopic boom forklift; that is, a fork leveling system of the telescopic boom forklift described in this embodiment is in a state of automatic leveling, in other words, the fork leveling system is in a passive leveling state, the automatic leveling method for a fork includes:

The fork 14 in the initial position is horizontal; the electric control oil supplement valve 11 and the electric control reversing valve 10 are both de-energized, the electric control oil supplement valve 11 is opened to enable the oil pump 9 to supply oil to the pressure reducing valve 12 through the electric control oil supplement valve 11, and the electric control reversing valve 10 is closed to enable the oil pump 9 not to supply oil to the first pipeline and the second pipeline through the electric control reversing valve 10, that is, the oil pump 9 cannot supply oil to the rodless cavity and the rod cavity of the active leveling oil cylinder 2 through the electric control reversing valve 10. Optionally, an electromagnet Y3 of the electric control oil supplement valve 11 is de-energized when the electric control oil supplement valve 11 is de-energized, the electric control oil supplement valve 11 is opened to enable the oil pump 9 to supply oil to the pressure reducing valve 12, as shown in FIG. 2, that is, the electric control oil supplement valve 11 is closed in energized state and opened in de-energized state. Optionally, electromagnets Y1 and Y2 of the electric control reversing valve 10 are de-energized when the electric control reversing valve 10 is de-energized, the electric control reversing valve 10 is closed to enable the oil pump 9 not to supply oil to the first pipeline and the second pipeline, as shown in FIG. 2, that is, the electric control reversing valve 10 is opened in energized state and closed in de-energized state. The automatic leveling method for a fork described in this embodiment, the oil pump 9 provides oil at stable oil pressure to the rodless cavity and the rod cavity of the active leveling oil cylinder 2 to replenish oil through the pressure reducing valve 12, that is, the oil pump 9 provides oil at stable oil pressure for the fork leveling system of the telescopic boom forklift to replenish oil; when the electric control oil supplement valve 11 and the electric control reversing valve 10 are de-energized at the same time, the oil pump 9 supplies oil to the pressure reducing valve 12, so that the electric power consumed by the electric control oil supplement valve 11 and the electric control reversing valve 10 may be reduced or avoided when the fork leveling system of the telescopic boom forklift is in the state of automatic leveling, so as to save electric power to a certain extent.

When the boom arm assembly 18 luffs upward, the passive leveling oil cylinder 4 extend to enable the oil in the rod cavity of the passive leveling oil cylinder 4 to enter the rod cavity of the active leveling oil cylinder 2 through pipelines, to drive the active leveling oil cylinder 2 to retract, and the oil of the rodless cavity of the active leveling oil cylinder 2 enters into the rodless cavity of the passive leveling oil cylinder 4. At this moment, the fork 14 is rotated downward to keep horizontal; optionally, the passive leveling oil cylinder 4 is connected to a support lug of passive leveling oil cylinder 20 on the boom arm assembly 18. Optionally, the oil of the rodless cavity of the active leveling oil cylinder 2 enters into the rodless cavity of the passive leveling oil cylinder 4 through the pressure diaphragm part of the active leveling balance valve 1 and the pressure diaphragm part of the passive leveling balance valve 3 in turn.

When the boom arm assembly 18 luffs downward, the passive leveling oil cylinder 4 retract to enable the oil in the rodless cavity of the passive leveling oil cylinder 4 to enter into the rodless cavity of the active leveling oil cylinder 2, to drive the active leveling oil cylinder 2 to extend, and the oil of the rod cavity of the active leveling oil cylinder 2 enters into the rod cavity of the passive leveling oil cylinder 4 through oil pipelines. At this moment, the fork 14 is rotated upward to keep horizontal; optionally, the oil of the rodless cavity of the passive leveling oil cylinder 4 enters into the rodless cavity of the active leveling oil cylinder 2 through the one-way valve part of the passive leveling balance valve 3 and the one-way valve part of the active leveling balance valve 1 in turn.

The automatic leveling method for a fork described in this embodiment is applicable to the above-mentioned telescopic boom forklift, the automatic oil replenishment function is effectively obtained when the fork leveling system of the telescopic boom forklift is in the state of automatic leveling, which may fully replenish oil without causing the malfunction of other valves, and may effectively avoid a failure of the fork leveling system failure, empty suction and leakage of the oil cylinder, and other problems caused by oil shortage of the active leveling oil cylinder 2. The technical features of the telescopic boom forklift disclosed above are also applicable to the automatic leveling method for a fork, and the technical features of the telescopic boom forklift disclosed above will not be repeated again. The automatic leveling method for a fork in this embodiment has the advantages of the telescopic boom forklift described above, and the advantages of the telescopic boom forklift disclosed above will not be repeated here.

The above descriptions are merely preferred embodiments of the present disclosure, and are not intended to limit the present disclosure. For those skilled in the art, the present disclosure may have various modifications and changes. Any modification, equivalent replacement, improvement, etc. made within the spirit and principle of the present disclosure shall be included within the protection scope of the present disclosure.

What is claimed is:

1. A fork leveling system, comprising:

an active leveling oil cylinder;

a passive leveling oil cylinder;

an electric control oil supplement valve; and an electric control reversing valve; wherein a rodless cavity of the active leveling oil cylinder is communicated with a rodless cavity of the passive leveling oil cylinder, and a rod cavity of the active leveling oil cylinder is communicated with a rod cavity of the passive leveling oil cylinder; and an oil inlet of the electric control oil supplement valve is connected to an oil pump, and an oil outlet of the electric control oil supplement valve is connected to the rodless cavity of the active leveling oil cylinder and the rod cavity of the active leveling oil cylinder, wherein when the fork leveling system is in a leveling state, the electric control oil supplement valve is controlled to be open, and the oil pump is controlled to supply oil to the rodless cavity and the rod cavity of the active leveling oil cylinder; and the electric control reversing valve comprises an oil inlet, a first working oil port, a second working oil port and an oil return port; the oil inlet of the electric control reversing valve is connected to the oil pump, the oil return port of the electric control reversing valve is connected to the oil tank, the first working oil port of the electric control reversing valve is connected to the rodless cavity of the active leveling oil cylinder through a first pipeline, and the second working oil port of the electric control reversing valve is connected to the rod cavity of the active leveling oil cylinder through a second pipeline.

2. The fork leveling system according to claim 1, further comprising a pressure reducing valve; wherein the oil outlet of the electric control oil supplement valve is connected to an oil inlet of the pressure reducing valve; an oil outlet of the pressure reducing valve is connected to the rodless cavity of the active leveling oil cylinder and the rod cavity of the active leveling oil cylinder.

3. The fork leveling system according to claim 2, wherein the oil outlet of the pressure reducing valve is connected to the rodless cavity of the active leveling oil cylinder through a first pipeline, and the oil outlet of the pressure reducing valve is connected to the rod cavity of the active leveling oil cylinder through a second pipeline; and the fork leveling system further comprises:

a first one-way valve, arranged between the oil outlet of the pressure reducing valve and the first pipeline; and/or, a second one-way valve, arranged between the oil outlet of the pressure reducing valve and the second pipeline.

4. The fork leveling system according to claim 1, further comprising a pressure reducing valve; wherein the pressure reducing valve comprises a pressure reducing overflow valve; the pressure reducing overflow valve comprises an oil inlet, an oil outlet and an oil return port; the oil inlet of the pressure reducing overflow valve is connected to the oil outlet of the electric control oil supplement valve, the oil outlet of the pressure reducing valve is connected to the rodless cavity of the active leveling oil cylinder and the rod cavity of the active leveling oil cylinder, and the oil return port of the pressure reducing overflow valve is connected to an oil tank; and the pressure reducing overflow valve is configured to allow a corresponding overflow oil to flow back into the oil tank when an oil pressure at the oil outlet of the pressure reducing overflow valve is greater than a preset oil pressure.

5. The fork leveling system according to claim 1, wherein the electric control oil supplement valve comprises a two-position two-way solenoid valve or a two-way electric control ball valve.

6. The fork leveling system according to claim 1, wherein the electric control reversing valve comprises a three-position four-way reversing valve.

7. The fork leveling system according to claim 1, further comprising a third overflow valve; wherein an oil inlet of the third overflow valve is connected to an oil outlet of the oil pump, and an oil outlet of the third overflow valve is connected to the oil tank; and the third overflow valve is configured to allow a corresponding overflow oil to flow back into the oil tank when an oil pressure at the oil inlet of the third overflow valve is greater than a preset overflow oil pressure; wherein the preset overflow oil pressure is less than or equal to a maximum working pressure of the oil pump.

8. The fork leveling system according to claim 1, further comprising an active leveling balance valve and a passive leveling balance valve; wherein the active leveling balance valve is arranged at an oil inlet and oil outlet of the rodless cavity of the active leveling oil cylinder, and the passive leveling balance valve is arranged at an oil inlet and oil outlet of the rodless cavity of the passive leveling oil cylinder.

9. The fork leveling system according to claim 8, wherein the active leveling balance valve comprises a pressure diaphragm part;

the pressure diaphragm part of the active leveling balance valve is opened when an oil pressure value of the rod cavity of the active leveling oil cylinder is greater than a preset oil pressure value of an active rod cavity to allow oil in the rodless cavity of the active leveling oil cylinder to flow out.

10. The fork leveling system according to claim 9, wherein the preset oil pressure value of the active rod cavity is a multiple of the oil pressure value of the rod cavity of the active leveling oil cylinder.

11. The fork leveling system according to claim 8, wherein the passive leveling balance valve comprises a pressure diaphragm part;

the pressure diaphragm part of the passive leveling balance valve is opened when an oil pressure value of the rod cavity of the passive leveling oil cylinder is greater than a preset oil pressure value of a passive rod cavity to allow oil to flow into the rodless cavity of the passive leveling oil cylinder.

12. The fork leveling system according to claim 11, wherein the preset oil pressure value of the passive rod cavity is a multiple of the oil pressure value of the rod cavity of the passive leveling oil cylinder.

13. The fork leveling system according to claim 1, further comprising a first overflow valve; wherein an oil inlet of the first overflow valve is connected to the first pipeline, and an oil outlet of the first overflow valve is connected to the oil tank; the first overflow valve is configured to allow a corresponding overflow oil to flow back into the oil tank when an oil pressure at the oil inlet of the first overflow valve is greater than a preset overflow oil pressure; the preset overflow oil pressure of the first overflow valve is less than a maximum allowable working pressure of the first pipeline.

14. The fork leveling system according to claim 1, further comprising a second overflow valve; wherein an oil inlet of the second overflow valve is connected to the second pipeline, and an oil outlet of the second overflow valve is connected to the oil tank; the second overflow valve is configured to allow a corresponding overflow oil flow back into the oil tank when an oil pressure at an oil inlet of the second overflow valve is greater than a preset overflow oil pressure; the preset overflow oil pressure of the second overflow valve is less than a maximum allowable working pressure of the second pipeline.

15. An automatic leveling method for a fork, applicable to the fork leveling system according to claim 1, comprising:

opening the electric control oil supplement valve when the fork in an initial position is horizontal to enable the oil pump to supply oil to the electric control oil supplement valve.

16. The automatic leveling method for a fork according to claim 15, wherein the automatic leveling method for a fork further comprises:

closing the electric control reversing valve when the fork in the initial position is horizontal to enable the oil pump not to supply oil to the first pipeline and the second pipeline.

17. The automatic leveling method for a fork according to claim 15, further comprising:

enabling the passive leveling oil cylinder to extend to enable oil of the rod cavity of the passive leveling oil cylinder to enter the rod cavity of the active leveling oil cylinder, so that the active leveling oil cylinder is driven to retract, and oil of the rodless cavity of the active leveling oil cylinder enters the rodless cavity of the passive leveling oil cylinder.

18. The automatic leveling method for a fork according to claim 15, further comprising:

enabling the passive leveling cylinder to retract to enable oil of the rodless cavity of the passive leveling oil cylinder to enter the rodless cavity of the active leveling oil cylinder, so that the active leveling oil cylinder is driven to extend, and oil of the rod cavity of the active leveling oil cylinder enters the rod cavity of the passive leveling oil cylinder.

19. A telescopic boom forklift, comprising:

a fork;

a boom arm assembly;

a chassis system; and the fork leveling system according to claim 1; wherein the passive leveling oil cylinder of the fork leveling system is connected between the boom arm assembly and the chassis system; and the active leveling oil cylinder of the fork leveling system is connected between the boom arm assembly and the fork.

* * * * *